July 1, 1958  A. J. GARTLAND, JR., ET AL  2,841,664
SPEED CONTROL AND REVERSING SWITCH
Filed March 29, 1956

Inventors:
Harry W. Uhlrig
Albert J. Gartland Jr.
by Richard L. Caslin
Their Attorney

United States Patent Office 2,841,664
Patented July 1, 1958

2,841,664

SPEED CONTROL AND REVERSING SWITCH

Albert J. Gartland, Jr., Shelton, and Harry W. Uhlrig, Stratford, Conn., assignors to General Electric Company, a corporation of New York Application March 29, 1956, Serial No. 574,842

6 Claims. (Cl. 200—18)

The present invention relates to an electric switch of the rotary type and particularly to a switch that is capable of controlling the speed as well as the direction of rotation of a self-starting shaded pole motor. Such a switch is of primary importance when used to control such a motor as part of an electric window fan for the intake or exhaust of the air in the room.

The present practice of switching electrically reversible fan motors is to use one switch for energizing the motor from the power source and a separate switch for reversing the direction of rotation of the motor. This invention is concerned with a single switch for selecting both the speed and rotation of an electric fan depending upon the direction in which the switch handle is turned and the amount that it is turned.

The basic snap action switch mechanism of the present switch is the same as is taught in the Hutt Patent No. 2,505,548 which is assigned to the same assignee as is the present invention. The parts in this switch which are common to those in the Hutt design are the insulating base plate, the general arrangement of the fixed contacts and the detent recesses in the base as well as the method of supporting and driving the movable contact blade upon the turning of the switch handle through the intervention of a snap acting spring mechanism.

The structure added by the present invention is a single pole, double throw switch mechanism arranged on the base plate of the switch for alternately controlling two pairs of shading coils on a small shaded pole type motor. When one pair of shading coils are connected together on opposite poles of the motor, they change the alternating flux between the pole pieces occupied by the rotor into a rotating magnetic field. Likewise, when the opposite pair of shading coils are connected together and the first pair are disconnected, the rotating magnetic field will turn in the opposite direction resulting in the rotor turning in the opposite direction. The switch mechanism for accomplishing this result includes three terminals mounted on the base plate of this switch opposite the fixed contacts. The middle terminal supports a V-shaped spring blade that is adapted for engagement with the two remaining terminals in an alternate manner. The movable contact of the switch is pivotally mounted on the base and it has one end for sweeping the fixed contacts. The opposite end is designated the detent end since it includes means such as a convex embossment for cooperating in one of a series of recesses in the base so that the movable contact moves in a step-by-step fashion as it is shifted through its several positions. Formed on the detent end of the movable contact is an insulating member that engages the V-shaped spring blade to control the movement of the spring blade toward and away from the terminals.

Accordingly, the principal object of this invention is to provide a rotary snap action switch for controlling the speed as well as the direction of rotation of a shaded pole type motor.

A further object of this invention is to provide a rotary snap action switch with a single pole, double throw mechanism for alternately connecting two pairs of shading coils of a shaded pole type motor.

A further object of this invention is to provide in a single rotary snap action switch the additional feature of a switch mechanism for alternately controlling the operation of two pairs of shading coils that determine the direction of rotation of the shaft of a motor.

Our invention will be better understood from the following description taken in connection with the accompanying drawing and its scope will be pointed out in the appended claims.

Figure 1:
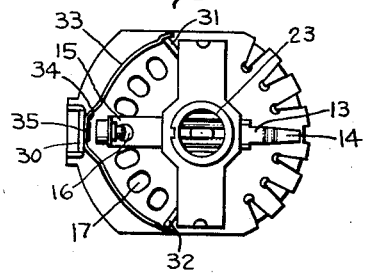
Figure 1 is a plan view of a switch embodying our invention with the handle removed and the mechanism shown in its "off" position.
Figure 3:
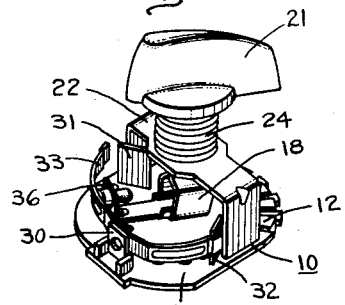
Figure 3 is an isometric view of the complete switch mechanism of our invention to show the actuation of the V-shaped spring blade.
Figure 4:
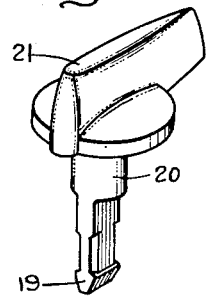
Figure 4 is an isometric view of the switch handle and its integral shaft with its flattened end for cooperation with the snap acting spring clip for controlling the movable contact.
Figure 7:
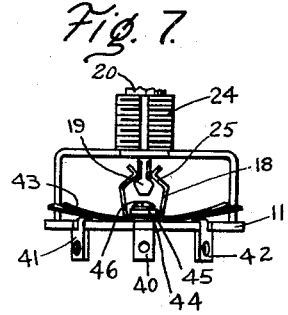
Figure 7 is a side elevational view of the modification of Figure 6 with a better showing of the configuration of the V-shaped spring blade.

Referring in detail to the drawing, and in particular to the views of Figures 1–3, 10 represents our switch comprising an insulating base plate 11, fixed contacts 12 arranged in an arcuate fashion along one side edge of the plate and a movable contact blade 13, best shown in Figure 1, that is pivotally mounted adjacent its midportion to the plate 11 so that one of its ends 14 may sweep the fixed contacts. The opposite end 15 of the movable contact is designated the detent end for it contains a concave embossment 16 that becomes seated in one of the series of recesses 17 in the base as the movable contact is turned through its various positions to provide the contact with a step-by-step action. A spring clip 18 is disposed around the movable contact 13 adjacent its pivotal axis for cooperation with the lower end 19 of the shaft 20 of the switch handle 21, as best seen in Figure 4. A U-shaped metal strap 22 is fixed at its free ends to the base plate 11 in a well-known manner, while the center portion of the strap contains an aperture 23 in which is supported an externally threaded nozzle 24 in cooperation with a pair of mounting nuts (not shown) for securing the switch in an opening in a thin panel member such as the base or housing of an electric fan or other appliance. The shaft 20 of the switch handle 21 is inserted into the nozzle 24 until the lower end 19 is engaged between the finger portions 25 of the clip 18, as best seen in Figure 7.

Figure 5:
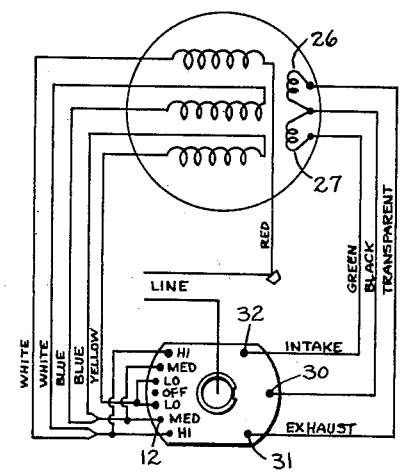
Figure 5 is a schematic wiring diagram of the switch of this invention as it would be connected to a shaded pole type motor.

The structure that has just been explained in a rudimentary manner is the same as taught in the abovementioned Hutt Patent No. 2,505,548. With this structure it is possible to control the speed of the motor by altering the circuit of the main windings of the motor as will be understood by studying the wiring diagram of Figure 5. This diagram shows two groups of shading coils 26 and 27 which are open-circuited when the switch is in the "off" position. However, when the circuit through either group is closed, the shading coils will be effective on a pair of opposite poles to cause the magnetic flux through those poles to lag behind the flux of the remaining poles to establish a rotating magnetic field for the rotor. Similarly, if the first group of shading coils were to be open-circuited and the remaining group were to be joined together, then the rotating magnetic field would be turning in the opposite direction.

Figure 2:
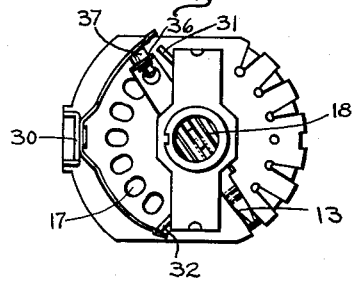
Figure 2 is a view similar to that of Figure 1 with the movable contact turned clockwise to one extreme position to best show the operation of the single pole, double throw switch mechanism that controls the shading coils.

The preferred embodiment of our invention of controlling the operation of the shading coils is best understood with relation to Figures 1 and 2 of the drawing. First, there are three terminals mounted on the base plate 11 opposite the edge containing the fixed contacts 12; namely, the middle terminal 30 and the side terminals 31 and 32. A V-shaped spring blade 33 is connected at its apex or midportion 34 by means of a suitable fastener such as a rivet or eyelet 35 to the inner side of the middle terminal 30. The free ends of the spring blade 33 are normally held in engagement with the side terminals 31 and 32 by the inherent spring action of the arms of the blade.

The detent end 15 of the movable contact has an upwardly extending lip 36 that carries an insulating piece 37 such as a nylon rivet having a bifurcated shank portion that is forced through an opening in the lip and is held therein by the natural expansion of the free ends of the shank. Thus, it will be understood that as the movable contact is turned from the central or "off" position of Figure 1 to either the "low," "medium" or "high" position when the contact moves either clockwise or counterclockwise, the insulating rivet 37 will engage one arm of the spring blade 33 and immediately open the circuit through the related side terminal 31 or 32 as the case may be. Hence, the opposite spring blade which still remains in contact with its terminal will actuate the related shading coils to turn the motor shaft in one direction. The opposite result will occur when the switch handle is turned in the opposite direction.

Figure 6:
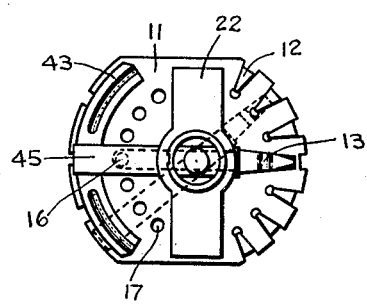
Figure 6 is a modification of our invention where the V-shaped spring blade is normally spaced from both of the related side terminals when the switch is in its "off" position.

In the second modification of Figures 6 and 7, the basic speed control mechanism of the switch is the same as in Figures 1 through 4. Figure 7 shows the three terminals for controlling the shading coils such as the middle terminal 40 and the side terminals 41 and 42. A V-shaped spring blade 43 also forms a part of this mechanism except that it is not arranged edgewise as in Figure 1, but is positioned flatwise so that the circuits through the side terminals are normally open when the switch is in the "off" position. The midportion or apex of the spring blade is connected to the middle terminal 40 by the same rivet 44 which holds the terminal to the base plate 11 of the switch. Another change that has been made is the use of an insulating arm 45 that is permanently attached to the movable contact 13 by the fastening means 46 that pivotally supports the contact 13 to the insulating plate. Accordingly, when the switch handle is turned, the insulating arm 45 will move with the movable contact 13 and depress one of the arms of the V-shaped spring blade 43 to close the circuit through the related side terminal of the switch. The operation of this mechanism is quite similar to that of the first modification except that instead of opening the circuit when the setting of the switch is changed, it closes the circuit but the end result is identical.

Having described our invention of a single switch assembly for controlling the speed as well as the direction of rotation of a shaded pole motor by merely turning the switch handle in either a clockwise or counterclockwise direction, it should be apparent that this design is simple in nature and reliable in operation having a minimum number of parts that may be made at a low cost.

Modifications of this invention will occur to those skilled in this art and it is to be understood, therefore, that this invention is not limited to the particular embodiments disclosed but that it is intended to cover all modifications which are within the true spirit and scope of this invention.

What we claim as new and desire to secure by Letters Patent of the United States is:

1. A snap action switch comprising an insulating base plate having a series of fixed contacts arranged at one end of the plate, a movable contact plate pivotally mounted adjacent its center on the base for sweeping engagement over the fixed contacts, a shaft supported from the base having an operating handle at its outer end, and spring means connected between the shaft and the movable contact for providing the switch with a snap action, the opposite end of the movable contact having detent means for cooperation with a series of recesses in the base plate for holding the movable contact in proper engagement with the fixed contact, the invention comprising a single pole, double throw motor reversing switch at the opposite end of the base plate from the fixed contacts with three spaced terminals, the middle terminal being centrally disposed on the base and carrying a V-shaped spring blade for engagement with the other terminals while the detent end of the movable contact has an insulating portion for controlling the position of the spring blades with relation to the terminals as the switch handle is turned.

2. A speed control and reversing switch for a shaded pole type motor comprising an insulating base plate, a plurality of fixed contacts on the base, a movable contact blade rotatably attached to the base having one end sweeping said fixed contacts, detent means on the other end of the blade cooperating with means on the base to restrain the movement of the blade in steps corresponding with the spacing of the fixed contacts, a spring member associated in driving engagement with the blade, a shaft supported from the base and having a handle on its outer end while its inner end is engaged by the spring, whereby the turning of the handle will tension the spring until it overcomes the restrained force on the detent end of the blade to shift the movable contact to the next fixed contact position; the invention comprising the motor reversing feature of the switch with three terminals fixed on the base, the middle terminal supporting a V-shaped spring blade for engagement with the other terminals, the detent end of the movable contact carrying an insulating member that is capable of controlling the movement of the V-shaped spring blade so that only one of the side terminals is joined with the middle terminal at any one setting during the operation of the switch.

3. A speed control and reversing switch as recited in claim 2 wherein the V-shaped spring blade is attached to the middle terminal with its arms normally biased toward each other into engagement with the side terminals.

4. A speed control and reversing switch as recited in claim 3 wherein the detent end of the movable contact has an upwardly extending lip that carries the said insulating member which engages the inside of either arm of the spring blade when the switch handle is moved from its "off" or central position where the detent end of the movable contact is in alignment with the middle terminal.

5. A speed control and reversing switch as recited in claim 2 wherein the V-shaped spring blade is attached at its apex to the top of the middle terminal with its arms extending slightly upward from the base plate and normally biased out of engagement with the side terminals.

6. A speed control and reversing switch as recited in claim 5 wherein the said insulating member is an arm that is fixed on the movable contact to move in a plane substantially parallel with the base plate of the switch so as to depress either arm of the spring blade into engagement with its related side terminal when the switch handle is moved from its "off" or central position where the insulating arm overlies the apex of the spring blade.

References Cited in the file of this patent

UNITED STATES PATENTS

| | | |
|---|---|---|
| 379,501 | Brann | Mar. 13, 1888 |
| 992,851 | Cheney | May 23, 1911 |
| 1,015,787 | Darrin | Jan. 30, 1912 |
| 1,671,615 | Spahr | May 29, 1928 |
| 2,285,665 | Jones | June 9, 1942 |
| 2,505,548 | Hutt | Apr. 25, 1950 |